Jan. 29, 1929.　　　A. E. OSWALD　　　1,700,329
ELECTRIC MOTOR
Original Filed Dec. 7, 1921　　3 Sheets-Sheet 1
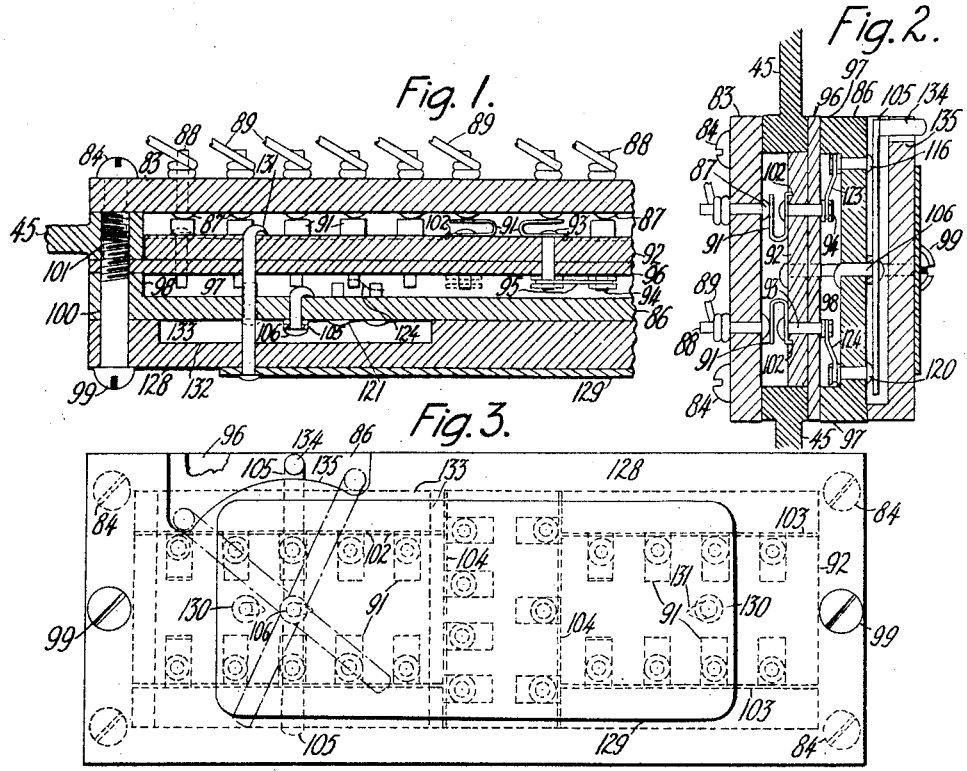
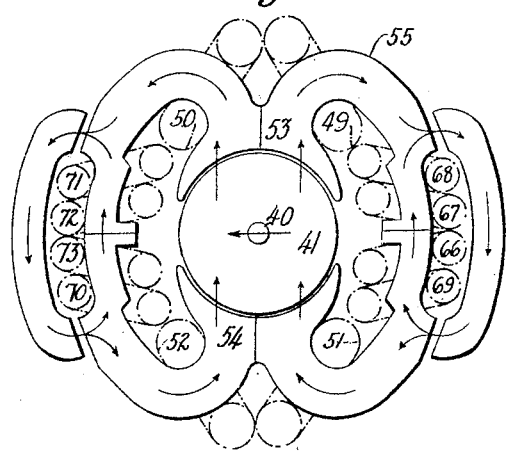
INVENTOR:
Alfred E Oswald
BY
ATTORNEY.

Jan. 29, 1929.

A. E. OSWALD 1,700,329

ELECTRIC MOTOR

Original Filed Dec. 7, 1921   3 Sheets-Sheet 2

INVENTOR:
Alfred E. Oswald
BY B. C. Stickney
ATTORNEY.

Jan. 29, 1929.　　　　　　　　　　　　　　　　　1,700,329
A. E. OSWALD
ELECTRIC MOTOR
Original Filed Dec. 7, 1921　　3 Sheets-Sheet　3

INVENTOR
Alfred E. Oswald
BY B.C. Stickney
ATTORNEY.

Patented Jan. 29, 1929.

1,700,329

UNITED STATES PATENT OFFICE.

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE.

ELECTRIC MOTOR.

Original application filed December 7, 1921, Serial No. 520,488. Divided and this application filed November 20, 1926. Serial No. 149,775.

This invention relates mainly to a novel connection and control block which may be removably attached to an electric motor, so as to be replaceable by any one of similar devices for adapting the motor to different conditions.

It is an object of the present invention to provide for regulating the speed of an alternating current motor at will, and to maintain the speed substantially constant for the rate at which it is set, whether with or without load, or for various loads.

The invention is illustrated in connection with the universally-convertible motor disclosed in my Patent No. 1,554,647, dated September 22, 1925 (application No. 427,346, filed November 30, 1920). In said motor speed regulation may be effected by cutting in or out certain auxiliary field coils, which, by reason of the characteristic magnetic circuit of the motor, also co-operate with the main field coils to keep the speed of the motor constant. By variously connecting the different auxiliary field coils, main field coils and armature coils the motor may be adapted to different conditions, and to this end is permanently provided with a terminal board or plate on which is arranged a set of terminals for the different coils.

For cutting in and out the auxiliary coils, and thereby changing the speed of the motor at will, there is preferably employed a multiple switch-board, having a contact-lever whereby all of the auxiliary coils may be connected, to give a maximum opposition to the field coils and thereby reduce the speed of the motor to the minimum, and whereby, whenever desired, two, four or six of the auxiliary coils may be cut out, increasing the speed accordingly. When only two coils are left in the series, maximum speed is secured. The speed will remain substantially constant as established by the regulating switch.

In the preferred form of practicing the invention, this switch, together with the terminals of the auxiliary coils, is placed upon a board, which is fastened upon the motor and carries a full set of contacts for the different coils, the armature, etc. This board may be double, or comprise two members or plates, one of which forms the aforesaid permanent terminal board and upon which are arranged the necessary permanent contacts, having appropriate permanent connections with the various coils in the motor. The other plate is removable, and carries the switch. Since the motor has the permanent contact plate embodied therein, it is only necessary to screw on the switch plate, having not only the switch but also appropriately connected contact pieces for the various other coils, whereupon the motor is ready for use. The desired speed may be secured by merely selecting the removable contact plate or switch suitable for that speed and applying it to the permanent contact plate.

Each removable contact or switch plate may be marked to indicate the work that will be performed by the motor when said plate is fastened thereto. An assortment of these removable plates may be kept in stock, so that when a dealer receives an order for a motor for either alternating or direct current, and for a certain frequency and a certain voltage and speed, he needs only to select the plate which is marked for such current, frequency, voltage and speed, and secure the same upon the motor, whereupon it is ready for the customer's use. Where the owner of a motor has occasion to use the same in a different circuit or for different range of speed or frequency, etc., he needs only to secure from the dealer an appropriate plate and substitute it for the old plate on the motor, whereupon it is ready for use in the new environment. When the user has to employ the motor in a variety of circuits, as in the case of a portable machine, he may purchase a motor with a complete set of contact plates, so that he can use it under all ordinary conditions. The connections are made automatically, by fastening the appropriate contact plate in position, whereupon the contacts make the necessary connections. An unlimited number of combinations may be set up, as explained in said patent.

It will thus be seen that the improved removable plate disclosed herein may be used alone, or may if desired form one of such a set of plates that may be in the possession of the user of the alterable motor, or that may be kept in stock by the manufacturer of the motor, for supplying a variety of requirements. It will thus be seen that at small expense and by simple and satisfactory means the adaptability and usefulness of the motor may be substantially increased by the use of the interchangeable novel speed-regulating switch plates.

This application is a division of my application, Serial No. 520,488, filed December 7, 1921, (now Patent No. 1,608,613, dated November 30, 1926).

Other features and advantages will hereinafter appear.

In the accompanying drawings,

Figure 1 is a section taken horizontally and longitudinally through the contact plate.

Figure 2 is a vertical section of the contact plate.

Figure 3 is a side elevation of the contact plate.

Figure 4 is a diagram of the motor showing the positions of the several coils for which the contact plate affords the required connections.

Figure 5:
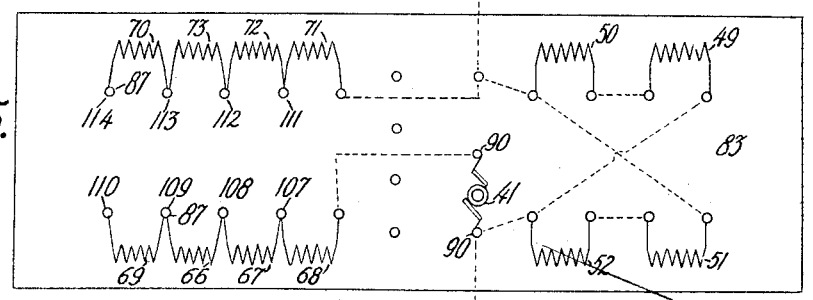
Figure 6:
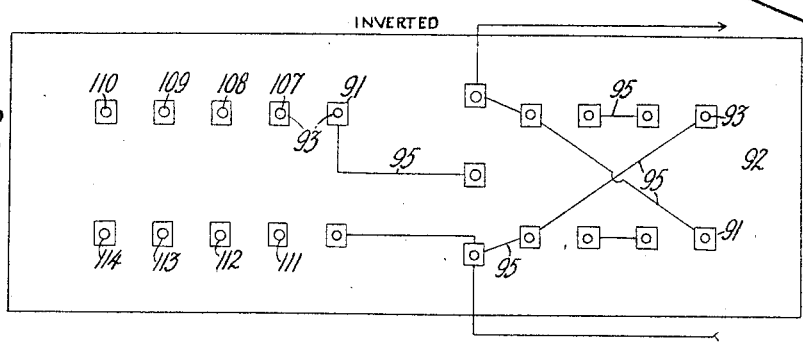
Figure 7:
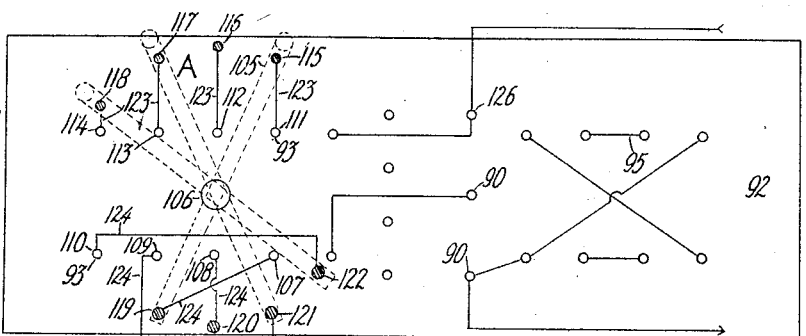
Figure 8:
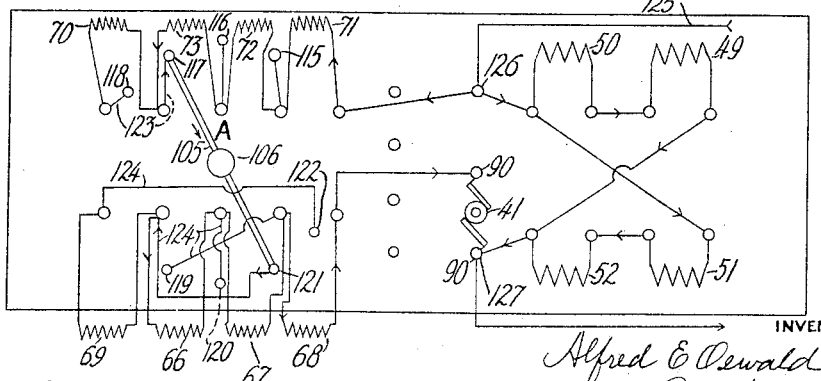
Figure 9:
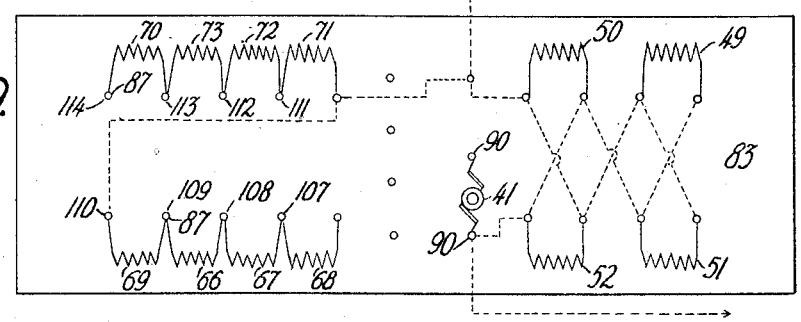
Figure 10:
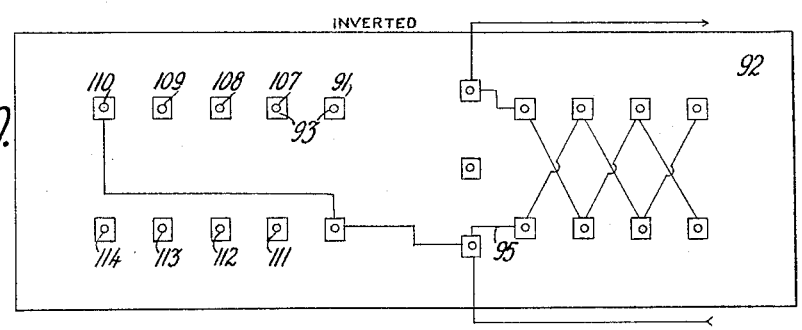
Figure 11:
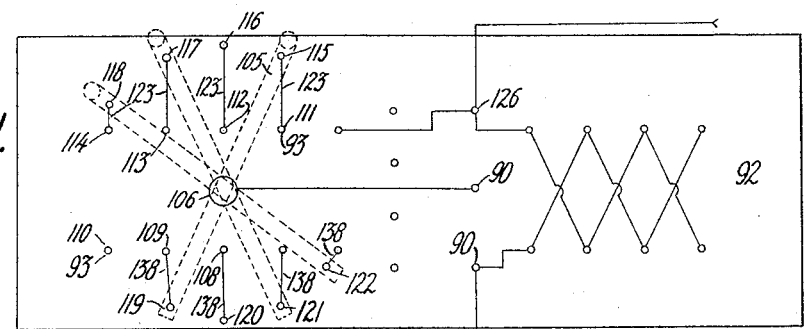

Figures 5 to 8 are diagrammatic views to show how the circuits are built up. Figure 5 shows in full lines the connections within the motor. Figure 6 is an inverted view of a detachable contact plate which co-operates with the terminals seen at Figure 5, to build up circuits as indicated in dotted lines in Figure 5, and in full lines in Figure 6. Figure 7 is a view of the other side of the plate seen at Figure 6, indicating diagrammatically the same circuit leads and also showing the leads which extend from some of the terminals to a set of switch terminals, the latter shown in section. Figure 8 shows the complete circuit built up by the parts shown in Figures 5 to 7.

Figures 9 to 12 show diagrams similar to Figures 5 to 8, but with the field coils arranged all in parallel, and with one set of auxiliary coils arranged in parallel with the other set.

One form of motor with which the present invention may be used is fully described in my aforesaid patents. Briefly described, the motor shaft is seen at 40, carrying an armature 41. Said shaft is journaled in bearings carried by partly shown heads 45 of the framework. The armature is provided with a commutator 47 to co-operate with brushes 48.

The main field coils are marked 49, 50, 51, 52, preferably two at each pole of the magnet, and capable of being connected in either series or parallel at each pole. The opposite poles are marked 53, 54, and these project inwardly from a magnet core which is designated generally as 55, and which is roughly of annular or endless form.

The auxiliary coils 66 to 73 are equally distributed on opposite sides of the ring, as shown in Figure 4.

When the motor is used for alternating current, the auxiliary coils 66—73 taken together form in effect the middle or neutral portion of the annulus into two separate magnets, which work against the four magnets formed by the field coils 49—52.

At Figure 1 is shown a section of a terminal plate 83 of insulating material secured upon the inner side of the partly-shown motor-head 45 by means of screws 84; the terminal plate 83 being well within the head, so as to accommodate the corresponding contact plate or block which is removable. The permanent or fixed terminals are in the form of heads 87 formed on posts 88 which are connected to the ends 89 of the various circuits. The arrangement of the terminals is seen at Figure 5, which also shows a diagram of the coils, etc., the commutator terminals being indicated at 90. Appropriate contacts 91 (Figures 1 and 3) depend from the contact plate, which includes an insulating block 92 to which they are secured by brass rivets 93, the ends 94 of which may be electrically connected by wires 95 in various ways to meet various requirements. The block 92 may be secured to the bottom of a plate 96, Figure 1, which, together with the cover plate 86, may form a box having sides 97 and ends 98 to contain the wires 95 and heads 94. Screws 99 may pass back through holes 100 in the cover plate 86 and the bottom plate 96 and thread into holes 101, Figure 1, in the head 45 of the motor casing for detachably securing the contact plate in position with the contacts engaging the appropriate terminals 87.

As one example of the various internal connections that may be made in the motor, there is shown at Figures 5 to 8 the manner of connecting for alternating current 110 volts, 30 cycles. It will be seen that, in this instance, the field coils are divided into two sets of two coils each, the coils in each set being in series while the sets themselves are in parallel.

A diagram of the connections so far described is seen at Figure 5, and Figure 6 (which shows the plate 92 inverted) gives the arrangement of contacts 91 therefor. It will be understood that this is only one of many arrangements of contacts that may be made up in adapting the motor for different conditions, as set forth in my aforementioned Patent, No. 1,554,647, and Figure 3 (which is not inverted) gives in dotted lines the locations for all such contacts. Each of them may have a nib 102, and these nibs may fit into longitudinal scores or grooves 103 and transverse grooves 104 formed in plate 92, to hold the contacts against rotative or other displacement.

Upon the outer face of plate 86 may be mounted a speed-controlling switch lever 105, pivoted between its ends at 106, and serving to enable the user to determine how many of the auxiliary coils (which are arranged in sets, the coils of each set being in series as at Figure 5) shall be effective. At Figure 8 auxiliary coils 69 and 70 are cut out of the circuit by the adjustment of said lever 105, so that, owing to the reduced opposition offered by auxiliary coils to field coils, the motor does not run at its lowest speed. It will be understood that one auxiliary coil is cut out at each side of the motor as seen at Figure 4, as it is desired that the two sides should balance. Terminals 87 and 93 indicated as 107, 108, 109 and 110 for the auxiliary coils 66—69 may be arranged oppositely from terminals 87 and 93 indicated as 111, 112, 113 and 114 for the auxiliary coils 70—73. It will also be seen that lever-contacts 115, 116, 117 and 118 (connected by leads 123 to terminals 111—114) are opposed respectively to lever-contacts 119, 120, 121 and 122 (connected in inverse order by leads 124 to terminals 107—110), and that, in shifting about its pivot, each step of the switch-lever cuts in or out a pair of coils; these positions of the lever being shown at Figure 7. These eight switch terminals are seen at Figures 7 and 8 connected by these short leads 123 and 124 to the corresponding auxiliary-coil contact-pins 93 in plate 92.

Figures 5 to 8 are diagrams of the terminal system. Figure 5 represents in full lines the terminals on plate 83, which are permanently connected to the various coils in the motor and armature. The remaining Figures 6 to 8 are diagrammatic views of the attachable contact plate. Figure 6 shows the plate 92 in detached, inverted position, to disclose the contacts 91, which engage the terminals 87 and effect the connections which are indicated by dotted lines in Figure 5. It will be seen at Figure 6 that certain of the contacts 91 or terminals 93 are connected by wires 95, corresponding to the wires seen in dotted lines in Figure 5.

It will be seen by comparing Figures 5 and 6 that the wiring is complete, except that connections are lacking from one series of auxiliary coils across to the other series. This cross connection is effected only by lever 105, and Figure 7 shows diagrammatically the plan of plate 92; that is, Figure 7 gives a view of one side of the plate and Figure 6 of the other side; the wiring 95 being also indicated diagrammatically at Figure 7.

At Figure 7 are also shown in section the switch-terminals 115 to 122 with which the ends of the lever 105 may contact, thus effecting a variety of connections from the auxiliary coils in one series to those in the other series, thereby cutting in and out different numbers of coils.

When the lever 105 is in the position marked A, at Figures 7 and 8, the two auxiliary coils 70 and 69 are cut out, so that the motor runs somewhat above its lowest speed, inasmuch as the tendency of auxiliary coils to oppose the field coils is now reduced. It will be understood that, when said lever is at the extreme left-hand position, connecting terminals 118 and 122, all of the auxiliary coils are cut in, and hence the motor runs at its lowest speed.

When said lever is in a vertical position (indicated at Figure 3), it connects terminals 116 and 120, whereby auxiliary coils 70, 73, 69 and 66 are cut out. With so many coils cut out, the opposition to the field coils is so greatly reduced that the motor runs nearly at its highest speed. When the lever is swung to the extreme right-hand position, Figure 8, and connects terminals 115 and 119, all of the auxiliary coils are cut out except 71 and 68, so that the motor runs at its highest speed. There need be no provision for cutting out coils 71 and 68, as it is always desirable to keep at least these two coils cut in, thereby maintaining uniformity of speed and gaining the other advantages pertinent to auxiliary coils.

When one end of the lever 105 is swung from one terminal to the next, thereby cutting out a coil in one series, its other end has a corresponding swing, thereby cutting out a coil in the other series, so that two coils are cut out or cut in at each such shift of the lever. It is also desirable for the operating coils in each series to balance those in the other series; oppositely-arranged coils 71 and 68 being always in, 72 being cut out or in at the same time with 67, 73 with 66, and 70 with 69. This gives the desired balance or effect in connection with the operation of the motor. In order to secure this result, notwithstanding the shifting of the ends of the lever in opposite directions, there is provided an inversion of the order of the connections 124 between the terminals 107—110 on plate 92 and the switch terminals 119—122 on plate 86, as indicated at Figure 7.

At Figure 8 is indicated the course of a current when the complete connection and controlling device is attached to the motor and the lever 105 is swung to the A position. The current may be regarded as entering at 125 and dividing at terminal 126. Part of the divided current passes through the field coils 50, 49 and the other part of the divided current passes through 51 and 52. Both parts then pass to terminal 127 and thence to the main. From 126 the remainder of the divided current passes through auxiliary coils 71, 72 and 73 to terminal 117, and thence through lever 105 in position A to terminal 121, thence through auxiliary coils 66, 67, 68 to the armature 41 and to terminal 127 and thence to the main.

A housing for the switch 105 may be provided by a plate 128, which may serve as a cap plate for the contact plate, and may carry a name plate 129 to designate the cycles, voltage and other data relative to the motor; this plate 129 being secured by rivets 130, which hold together all the plates in the detachable device, namely, 92, 96, 86, 128 and 129. These rivets are preferably headed at their outer ends and clinched over at their inner ends, as at 131. The plate 128 has an undercut portion 132 to form a clearance or housing 133 for the lever 105. The lever may have a finger-piece 134 to project up above the top of the contact plate, Figure 2, the plate 128 being cut away at 135 to accommodate the movement of said finger-piece. The screws 99 pass through plate 128 and hold the entire device detachably upon the motor. Upon removing these screws 99, the contact plate may be removed, and another one substituted, to adapt the motor for different current, or work or speed; and the substituted device may or may not have a switch 105, etc., or other means for changing speed at will. The switch, lever or speed-changer 105 may be used in connection with other combinations of field coils, etc.

It will be understood, as set forth in my aforesaid Patent No. 1,554,647, that the field coils can be connected across the mains in either series or parallel relation, and that the connection of the auxiliary coils can be changed to correspond with any such relation of the field coils, so that they co-operate with the field coils and the armature to regulate the speed of the motor, and that the lever 105 may still be employed for cutting out one or more auxiliary coils from each series, for increasing the speed of the motor to the extent desired. Such reconnection of the coils may be effected by the use of appropriate contacts and wirings, which may be made upon a substitute plate such as 92, 96, and such substitute plate may also carry a plate 86 and lever 105, thus forming a contact plate which may be substituted bodily for the one illustrated; and the user of the motor may provide himself with a large number of other contact plates, several of which may have speed-changing levers 105, and any contact-plate, whether with or without a speed-changing lever, may be readily substituted in the motor.

Figures 9 to 12 correspond with Figures 5 to 8, but show another contact plate having suitable contacts and wiring for alternating current, 60 cycles, 130 volts, or 120 cycles, 260 volts, or 30 cycles, 65 volts. In Figures 9 to 12, the field coils are connected separately across the line or in parallel, to make it suitable for 130 volts, 60 cycles. To trace the connection of the field coils, at Figure 12, it will be seen that the current coming in from main 125 passes through coil 50 and returns through diagonal wire 127 to the other main 128. Again, the current flows from main 125 through diagonal wires 129, 130, to coil 49, and returns through diagonals 131, 132 and 127, to main 128. Again, the current passes through main 125 across the diagonal 129 to coil 52 and thence back to the main 128. Current also flows through 125 and through diagonals 129, 130 and 133 to coil 51 and then through diagonals 132 and 127 to the main 128. The set of auxiliary coils 70, 71, 72, 73 has a series arrangement, and the same is true of the auxiliary coils 66, 67, 68 and 69. One series is therefore in parallel with the other series of auxiliary coils; and, by means of lever 105, an auxiliary coil may be cut out of each set simultaneously, or two coils may be cut out, or three, from each set; one coil always remaining connected in each set, as in the arrangement at Figures 5 to 8.

Figure 12:
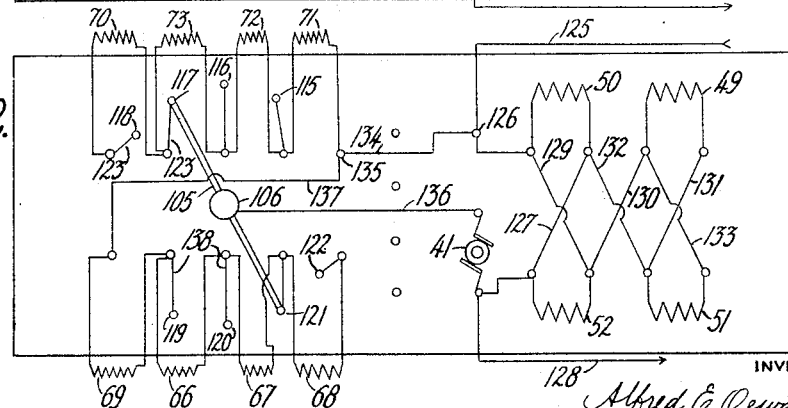

Referring to Figure 12, it will be seen that the current flowing in from the main 125 divides at the terminal 126, part flowing through the parallel field coils, and the remainder flowing through a wire 134 to a terminal 135, where it subdivides, one portion of the subdivided current flowing through the coils 71, 72, 73 and lead 123 to switch-terminal 117, thence through the lever 105, wire 136, armature 41, and thence out through the main 128. The other part of the current subdivided at 135 flows through a wire 137 and auxiliary coils 69, 66 and 67 to switch-terminal 121, and thence through lever 105 and wire 136 to the armature and out to the main 128. The auxiliary coils are connected to oppose the field coils, and their opposition may be reduced without altering the parallel arrangement of the two sets or series of auxiliary coils. It will be noted that the switch leads 138 from the coils 66, 67, 68 are not reversed in their order, as is the case with the leads 124 at Figure 8.

Variations may be resorted to within the scope of the invention, and portions of the improvements may be used without others.

Having thus described my invention, I claim:

1. A removable connection and control block for a motor, including a supporting member, insulated contact-pieces thereon designed for detachable connection to contacts on a motor-terminal member, permanent electrical connections between certain of said contact-pieces, and a switch-device for selectively effecting different connections of certain of said contact-pieces.

2. A removable connection and control block for a motor, including a supporting member, insulated contact-pieces thereon designed for detachable connection to contacts on a motor-terminal member, a switch-device, and permanent electrical connections between certain of said contact-pieces and between certain contact-pieces and said switch-device, said switch-device serving to selectively effect different connections of the contact-pieces connected therewith.

3. A removable connection and control block for a motor, including a supporting member, insulated contact-pieces thereon designed for detachable connection to contacts on a motor-terminal member, a switch-device having a shiftable handle or finger-piece, permanent electrical connections between certain contact-pieces and between certain contact-pieces and said switch-device, and enclosing means forming part of said block and designed to enclose said permanent connections and all of said switch-device except its handle or finger-piece.

4. A removable connection and control block for a motor, including a supporting member, insulated contact-pieces thereon designed for detachable connection to contacts on a motor-terminal member, a switch-device having a shiftable handle or finger-piece, permanent electrical connections between certain contact-pieces and between certain contact-pieces and said switch-device, and enclosing means forming part of said block and designed to enclose said permanent connections and all of said switch-device except its handle or finger-piece, said contact-pieces arranged at the inner or motor side of said block and said handle or finger-piece arranged to be accessible from the outside of the motor when said block is attached thereto.

5. A removable connection and control block for a motor, including a supporting member, insulated contact-pieces thereon designed for detachable connection to contacts on a motor-terminal member, a switch-device having a shiftable member and also having contact-points arranged so that at each step of the switch-member a different pair of contact-points is engaged, and permanent electrical connections between certain contact-pieces and between certain contact-pieces and said switch-device, said switch-device serving to selectively effect different connections of certain pairs of contact-pieces, thereby to cut in or out certain pairs of motor-elements.

6. A removable connection and control block for a motor, including a supporting member, insulated contact-pieces thereon designed for detachable connection to contacts on a motor-terminal member, a switch-device, and permanent electrical connections between certain of said contact-pieces and between certain contact-pieces and said switch-device, said switch-device serving to selectively effect different connections of the contact-pieces connected therewith, said switch-device including a supporting plate or member forming part of said block and designed to overlie and thereby enclose said permanent electrical connections.

ALFRED E. OSWALD.